(12) United States Patent
Tenney et al.

(10) Patent No.: US 6,944,584 B1
(45) Date of Patent: Sep. 13, 2005

(54) SYSTEM AND METHOD FOR CONTROL AND SIMULATION

(75) Inventors: John A. Tenney, Oakland, CA (US); W. Marcus Ruark, Redwood City, CA (US); Greger J. Orelind, San Francisco, CA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 09/549,268

(22) Filed: Apr. 14, 2000

Related U.S. Application Data

(60) Provisional application No. 60/129,828, filed on Apr. 16, 1999.

(51) Int. Cl.[7] ............................. G06F 17/50; G06F 19/00
(52) U.S. Cl. ......................... 703/22; 703/15; 700/86; 700/17
(58) Field of Search ......................... 700/245, 16, 17, 700/86; 703/14, 15, 22; 717/106

(56) References Cited

U.S. PATENT DOCUMENTS

| | | | |
|---|---|---|---|
| 4,730,258 A | 3/1988 | Takeda et al. | 364/513 |
| 4,754,415 A | 6/1988 | George et al. | 364/513 |
| 4,835,730 A | 5/1989 | Shimano et al. | 364/513 |
| 4,852,047 A | 7/1989 | Lavallee et al. | 364/191 |
| 5,148,591 A | 9/1992 | Pryor | 29/407 |
| 5,247,650 A | 9/1993 | Judd et al. | 395/500 |
| 5,268,837 A | 12/1993 | Saylor | 364/167.01 |
| 5,297,238 A | 3/1994 | Wang et al. | 395/94 |
| 5,506,787 A | 4/1996 | Muhlfeld et al. | 364/474.23 |
| 5,511,147 A | 4/1996 | Abdel-Malek | 395/99 |
| 5,555,179 A | 9/1996 | Koyama et al. | 364/468.01 |
| 5,565,748 A | 10/1996 | Takizawa et al. | 318/568.1 |
| 5,579,442 A | 11/1996 | Kimoto et al. | 395/81 |
| 5,581,666 A | 12/1996 | Anderson | 395/98 |
| 5,586,224 A | 12/1996 | Kunii et al. | 395/95 |
| 5,657,460 A | 8/1997 | Egan et al. | 395/326 |
| 5,691,897 A | 11/1997 | Brown et al. | 364/167.01 |
| 5,737,500 A | 4/1998 | Seraji et al. | 395/86 |
| 5,790,977 A | 8/1998 | Ezekiel | 702/122 |
| 5,805,442 A | 9/1998 | Crater et al. | 364/138 |
| 5,847,957 A | 12/1998 | Cohen et al. | 364/468.15 |
| 5,864,862 A | 1/1999 | Kriens et al. | 707/103 |
| 5,867,385 A | 2/1999 | Brown et al. | 364/167.02 |
| 5,887,139 A | 3/1999 | Madison, Jr. et al. | 395/200.53 |
| 5,923,885 A | 7/1999 | Johnson et al. | 395/712 |
| 5,956,487 A | 9/1999 | Venkatraman et al. | 395/200.48 |
| 5,975,737 A | 11/1999 | Crater et al. | 364/138 |
| 6,038,486 A | 3/2000 | Saitoh et al. | 700/96 |
| 6,053,951 A | 4/2000 | McDonald et al. | 717/1 |
| 6,161,051 A * | 12/2000 | Hafemann et al. | 700/86 |

* cited by examiner

*Primary Examiner*—Thai Phan
(74) *Attorney, Agent, or Firm*—Weingarten, Schurgin, Gagnebin & Lebovici LLP; Richard Pickreign

(57) ABSTRACT

A system that controls devices and integrally simulates the controlled motion of devices. The control and simulation system allows simultaneous development hardware and software in controlled device installations and increase operational ease-of-use and diagnostic capabilities. The control and three dimensional simulation system also allows client computers to remotely control the system and other devices connected to a network.

24 Claims, 10 Drawing Sheets

FIG. 1 ControlFoundry System Block Diagram

Workcell Containing Origin, Table, Robot, Gripper, Pallet, and Part

Typical Flowchart Program

TypicalControlFoundry Graphical User Interface

Merged 3-D Diagnostic and Monitoring Display

Displays of Merged and Standalone Clients

A Collection of Networked Home Appliances

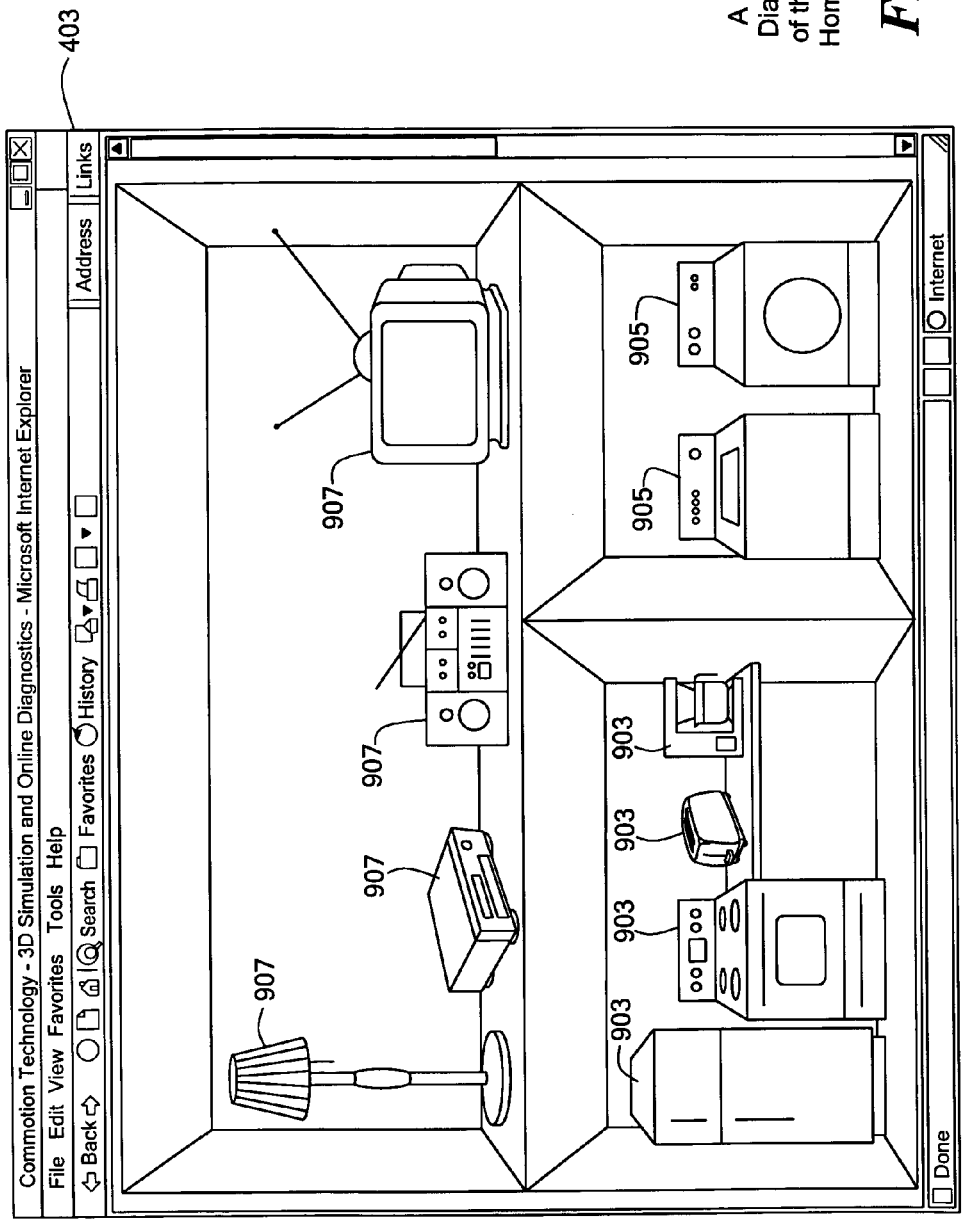
FIG. 10 A Merged 3-D Diagnostic View of the Networked Home Appliances

SYSTEM AND METHOD FOR CONTROL AND SIMULATION

CROSS-REFERENCE TO RELATED APPLICATIONS

Priority of U.S. Provisional Patent Application Ser. No. 60/129,828, filed Apr. 16, 1999, incorporated herein by reference, is hereby claimed.

BACKGROUND

A basic robotic system includes a mechanical robot, a computer and software. The computer must be programmed with software that controls the mechanical robot to perform the required tasks for each specific application.

Although existing robotic systems are highly flexible machines, they are very expensive and time consuming to program. Existing robotic systems use obscure, proprietary, low-performance text-based programming languages. Specially trained programmers are required to develop the application software for the robot motion of these proprietary robotic systems. The acceptance and installation of robotic systems in industrial applications has been slower than anticipated. Because learning, writing and debugging these proprietary computer language programs is extremely difficult, industrial applications for robots have been limited to relatively simple tasks such as welding, painting, and material handling.

Most robotic systems are developed sequentially. First, the hardware is developed and then the software is developed. Sequential development is necessary since the software developers cannot test the robotic operating software until a functional hardware prototype is available. To overcome this delay, proprietary robotic hardware simulation systems have been developed that allow some simulated testing of the robotic software before the robotic hardware has been fully developed. Existing robotic hardware simulation systems require users to write a robotic simulation program in a proprietary programming language that is different than the proprietary programming language used to control the actual robot. Developers must first write a simulation program and then write an operating program that is a translation of the simulation program.

After the operating software is developed, the operating software and simulation software function independently. The independent operation of the operating software and simulation software is problematic because the simulation software is not revised when the operating software is modified. After the operating software is modified the simulation software no longer replicates the operating software, rendering the simulation software inaccurate and useless. What is needed is an integrated control and simulation system that automatically updates all system components when either the control or simulation programs are modified.

Another problem with proprietary robotic systems is that the operating software provides little support for diagnosing and correcting system errors. Accurate and complete documentation for proprietary robotic systems is typically limited or even nonexistent making it difficult for operators to interpret program error messages and correct system errors. In addition, many proprietary robotic systems have large numbers of similar components each producing a similar error message which can be difficult to decipher and distinguish. What is needed is a control and simulation system that can graphically diagnose system errors to simplify software error detection and correction.

Many proprietary robotic systems only provide minimal provisions for external communications and operate as self-contained "islands of automation". Current proprietary robotic controllers typically only provide an RS-232 serial port for external communications. Intermediate machines are required to translate communication signals transmitted between the RS-232 port of the proprietary robotic controller and network transactions. More complex programs must be written when network communications are required and intermediate machines are used. What is needed is an integrated control and simulation system that utilizes nonproprietary network protocols for simplified network communications.

SUMMARY OF THE INVENTION

The inventive control and simulation development software allows developers to write control and simulation programs for controlling devices using object-oriented and graphical programming. Control and simulation programs can be produced by creating and connecting multiple program steps or "objects" into a graphical flowchart representation. Because the control and simulation development software uses a nonproprietary computer language, device control and simulation programming is simplified. The inventive control and simulation development software also has an open architecture that allows for simplified future development and is compatible a wide variety of devices, sensors, systems, machines and appliances, and is particularly compatible with automation machinery such as robotic systems.

The inventive control and simulation development software allows users to produce application software that fully integrates both device control and three-dimensional (3-D) simulation into a single program. The control and simulation development software allows users to write device control programs and immediately simulate, test and debug the program in a 3-D virtual environment. After the device control program has been fully tested in simulation, the same program can be used to control actual devices. While the program is controlling the actual devices the inventive control and simulation system can simultaneously display a 3-D illustration of the device movement and diagnostic information such as the location of devices, robots, or parts in the system requiring attention. The inventive integrated control and simulation development software greatly simplifies the work required to develop device control software, and the integrated simulation capability enables concurrent engineering of the software and hardware during both development and operational phases.

The present invention also allows remote control and monitoring of the robotic system. A computer running the control program can be configured as a server that communicates with one or more remote client computers and other servers over a network. The client computers may have graphic user interfaces (GUIs) for simplified control and monitoring of one or more servers. Various levels of server access are available depending upon the client's status.

BRIEF DESCRIPTION OF THE DRAWINGS

The invention is herein described, by way of example only, with reference to embodiments of the present invention illustrated in the accompanying drawings, wherein:

FIG. 10 is an embodiment of the invention used with a merged 3-D control and diagnostic display of a collection of networked home appliances.

DETAILED DESCRIPTION

The present invention addresses the above and other problems associated with robotic control and simulation systems. Aspects of the present invention may be implemented on one or more computers each executing software instructions. The steps of controlling devices, accessing, downloading, and manipulating data, as well as other aspects of the present invention are implemented by a central processing unit (CPU) in computers which execute sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

According to one embodiment of the present invention, a server computer system transmits and receives data over a computer network or standard telephone line. Data may be loaded into the memory of the server computer from a storage device, or from one or more other computer systems over a network connection. For example, a client computer may transmit a sequence of instructions to the server computer in response to a message transmitted to the client over a network by the server. As the server receives the instructions over the network connection, the instructions are stored in the server's memory. The server may store the instructions for later execution, or it may execute the instructions as they arrive over the network connection. In some cases, the CPU may directly support the downloaded instructions. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, or to any particular source for the instructions executed by the server or client computers.

Figure 1:
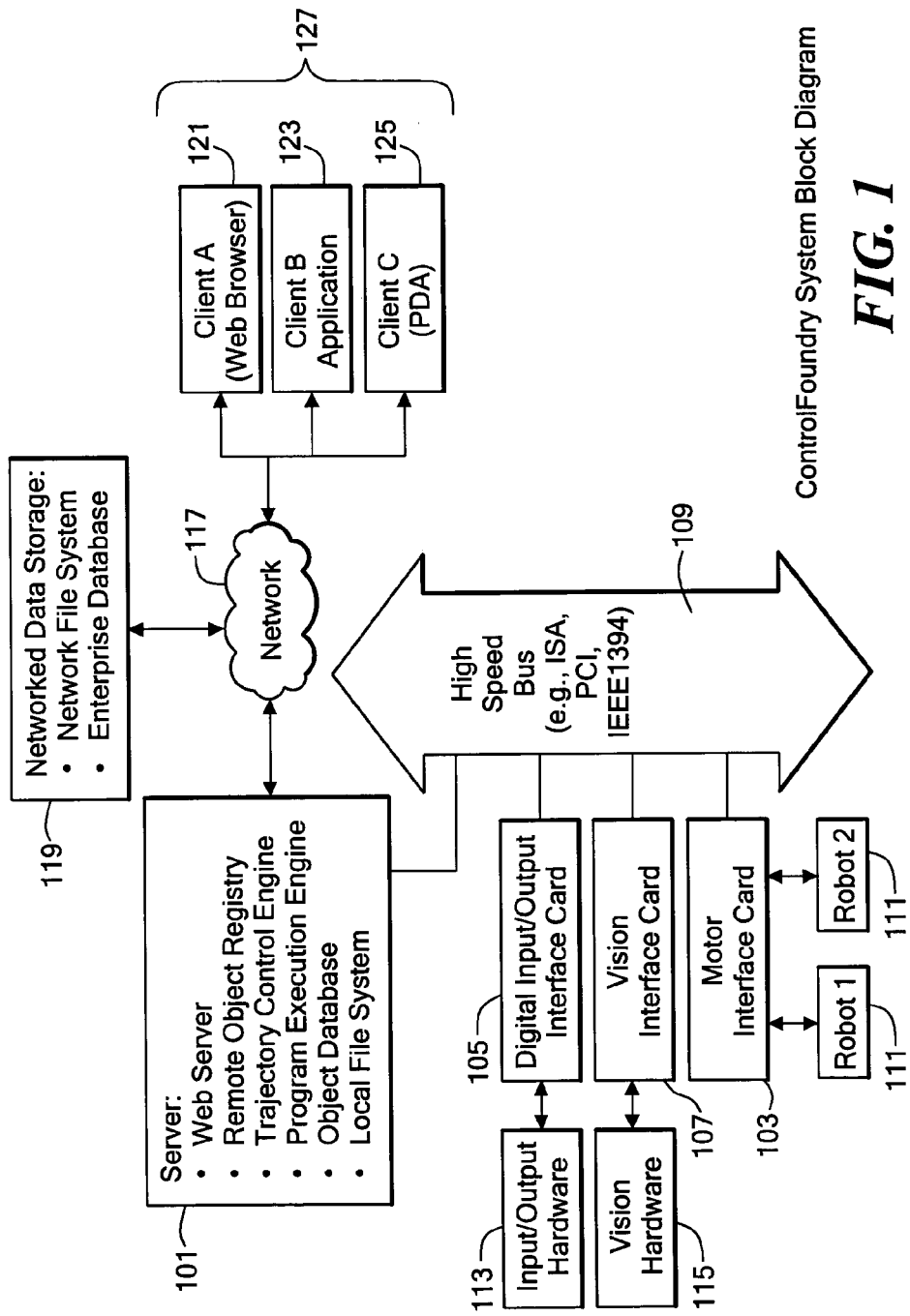
FIG. 1 is a block diagram of an exemplary workcell with a server and clients.

Referring to FIG. 1, a block diagram of a version of the inventive control and simulation system is illustrated in an exemplary configuration. The inventive control and simulation software includes a server program and a client program. The server computer 101 runs the server program and is connected to a motor interface 103, an I/O interface 105, and a vision interface 107 through a high-speed bus 109. The server computer 101 controls one or more devices or robots 111 through a motor interface 103. Robots include: articulated robots, cylindrical robots, Cartesian robots, simple single-axis motors, Stewart platforms, conveyors, personal robots, motors or any device that moves or requires some form of motion control. Input and output hardware 113 communicate with the server computer 101 through an input and output interface 105. Input and output hardware 113 represents all forms of sensors, triggers, switches, LEDs, visual displays, and other devices and maybe analog or digital. The server computer 101 is connected to vision hardware 115 through a vision interface 107. Typical vision hardware 115 might include video cameras, video cassette recorders, or dedicated vision processing systems. Data may be stored locally in the server computer 101 or remotely in networked computer or a networked database system 119.

The server computer 101 may operate as a standalone unit or connected to other servers or clients 121, 123, and 125 through the network 117. The inventive server software may run on a standard operating system or an embedded operating system such as the VxWorks or Linux operating systems.

The server 101 controls and maintains a real-time control loop with the input/output hardware 113, vision hardware 115 and robots 111. The server 101 transmits commands two and receive data from the motor interface card 103, the I/O interface card 105, and the vision interface card 107 on a high-speed bus 109 (ISA, PCI, USB or other) or alternatively through interface is connected to a high-performance networks such as IEEE-1394 (FireWire). In an alternative embodiment, the motor interface, the I/O interface, and the vision interface may be located at their associated hardware components, remote from the server computer. The server computer may communicate with the server controllers through a variety of information protocol such as IEEE-1394 (FireWire), USB, SERCOS, DeviceNet, Ethernet, Gigabit Ethernet, etc. In another alternative embodiment, the server computer may be able to produce the required hardware control signals so that interface devices are not required.

The local physical environment of the controlled device (s) is known as the workcell. Physical items in a workcell are represented by corresponding software objects stored in a directory-like data structure called the workspace. The workspace may contain robot objects, objects representing input/output interface devices, vision cameras, and other objects. User programs and objects that do not have a physical manifestation can also exist in the workspace. The objects in the database can communicate directly with locally controlled devices or with remotely controlled devices through the network using any communication protocol.

Figure 2:
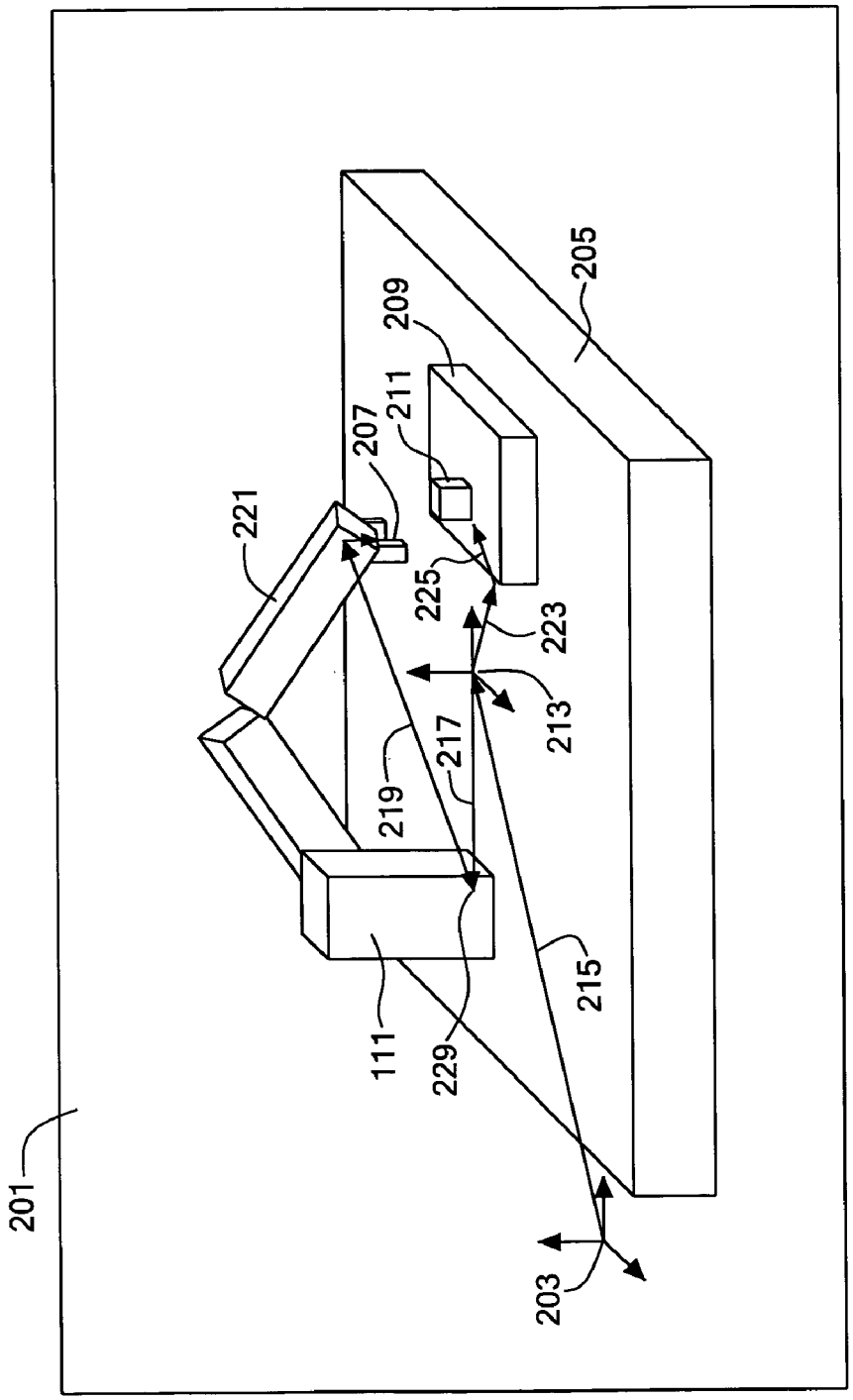
FIG. 2 is a scene graph structure for describing locations in both simulation and real control of a typical workcell.

The inventive control and simulation software graphically displays the software objects as a simulation of the physical objects in the workcell. These software objects are assembled in a 3-D scene graph structure, as shown in FIG. 2. Locations are represented as homogeneous transformations which combine the relative X-Y-Z position and angular offsets of a first object relative to a second object in a four-by-four matrix of floating-point values. Each object can have a parent object and any number of child objects. Movement of a parent object causes movement of all child objects, but movement of a child object can be independent of parent object movement.

Each workcell 201 has a single origin 203 that defines the point from which the position of all objects in the workcell 201 are defined in a coordinate system. In the exemplary workcell 201 the workcell origin 203 is the parent of the table 205. Offset 215 is the relative position of the table's center 213 from the workcell origin 203. Table 205 is the parent of the robot 111 and offset 217 is the relative position of the robot base 229 from the table's center 213. Offset 219 is the relative position of the robot tip from the robot base 229 which changes dynamically depending on robot 111 motor positions. Robot 111 is the parent of the gripper 207. The gripper 207 is typically not offset from the robot's tip since it is mounted to the tip, however tip offset 221 specifies the relative positions of the fingers of the gripper 207. Table 203 is the parent of the pallet 209 and offset 223 is the relative position of the pallet 209 from the table's center 213. Pallet 209 is the parent of part 211 and offset 225 is the relative position of the part 211 from the pallet 209. When a program commands the robot 111 to pick up part 211, the robot 111 will be instructed to move so that the cumulative offset of the gripper tip 207 from the workcell origin 203 matches the cumulative offset of the part 211 from the workcell origin 203.

As discussed, the prior art robot systems utilize proprietary robot controllers. For example, Adept Technology robots are controlled by proprietary Adept Technology controllers, similarly, ABB robots are controlled by proprietary ABB controllers. The inventive server software is compatible with these proprietary controllers and can communicate with them through serial ports, dynamically linked library calls, Ethernet, or ActiveX calls. When used with proprietary controllers, the inventive server software commands the motion endpoints of each controlled device movement and the proprietary controller handles the trajectory generation of the device movement.

The server software also contains a motion computation engine that computes user-specified trajectories and allows the robot or device to perform complex motions with precise control of the motion trajectory. The server computer provides the motor interface with position information at specific time intervals. For precise motion trajectory the intervals between robot position data can be one millisecond or less. Alternatively, position information at much longer intervals can be used to produce a less precise robot motion trajectory. The server software also allows the robot to perform motion blending and forward processing. Forward processing allows the process program to continue after starting a motion, without waiting for that motion to complete. If the next motion command is reached before the first motion completes, the first motion is blended together with the next motion to provide a smooth, fast transition. Other motion functions include S-curve trajectory generation and straight-line motion with arbitrary kinematics.

The server software can also process vision images acquired from a networked camera (over IEEE-1394 or Ethernet, for example) or from specialized image-capture interface board mounted on the server's internal bus. The image from the camera may be processed by a processor built in the image-capture board or by the server CPU. The vision capability allows the server computer to inspect objects or search for objects within the range of the robot. The inspections can obtain specific information including normalized grayscale correlation (NGC), optical character recognition (OCR), blob analysis, edge finders, morphology and other functions. The visual inspection can be performed relative to coordinates returned by other inspections. For example, if a feature on an object is located by a camera at specific coordinates, a second visual inspection can be performed relative to those coordinates to further refine measurement of the feature. Vision boards or image processing components are commercially available. The server is compatible with various digital camera formats and image formats including: RS170, RGB, NTSC, CCIR, TIF, JPG, BMP, monochrome, color and other formats.

As discussed, the inventive software can be configured to actually control devices or simulate the control of devices, and to easily switch from one mode to the other or operate in a mixed mode. When controlling real devices, the server communicates with actual device hardware causing the devices to perform the programmed task. The server reports to clients the actual motion of the robots based upon the actual robot positions measured by position sensors that are connected to the server through the I/O ports. When and simulation mode, the server reports the command values for robot motions and input/output port values. As a result, when creating or modifying server process programs or other control software, programmers can fully validate the software offline on a simulated server at their workstation before it is brought online on the real hardware. The inventive server system can also run in a mixed mode where some of the device hardware is operational in some devices are simulated.

Referring back to FIG. 1, the server computer 101 may be connected through a network 117 to one or more client computers 121,123, and 125, running the inventive client software. In particular, when the server is running on embedded operating systems that do not have user interface capabilities, all editing, status and control information is handled remotely through network interfaces. The client computers 121, 123, and 125 may include personal computers 121 and 123 or personal digital assistants (PDAs) 125 having smaller processing power or other CPU operated devices. One or more client computers 121, 123, and 125 may be coupled, directly or indirectly, to a server computer 101 through a network 117. The network 117 may include: RS-232 or RS-485 serial ports, parallel ports, the Internet, intranet, wireless communication, a Wide Area Network (WAN), a Local Area Network (LAN), any other suitable electronic communications means or any combination thereof.

The protocol used to transmit information over the network 117 between the server computer 101 and the client computers 121, 123, and 125 is Java's remote method invocation (RMI), though other protocols—such as Common Object Request Broker Architecture (CORBA), Microsoft's Distributed Common Object Model (DCOM), or any other suitable high-level messaging protocol—could be used by a person skilled in the art. The message packets may be composed of Java serialized objects, XML, or other standard or custom packet structures. The inventive control and simulation system also implements the semiconductor industry specific information protocol SECS-II as an option for transmitting control information between devices and machines used in the semiconductor industry. This SECS-II implementation is object-oriented and SECS-II messages can be constructed from XML markup tags.

In the preferred embodiment, the clients 127 operates either as a standalone application 123 application or as an applet within a web browser 121. When the clients 127 attempt to communicate over the network 117 with the server 101 but do not possess the required software classes, the appropriate software classes are automatically downloaded from the server 101. This not only prevents cumbersome software installation on the clients 127, but also assures compatibility of the software used on the clients 127 and the server 101. When run within a web browser, the server 101 may also send web content such as HTML, JavaScript, XML-formatted data, or Microsoft ActiveX controls. Applets using ActiveX or Java code provide more active content than is possible with simple HTML.

Figure 3:
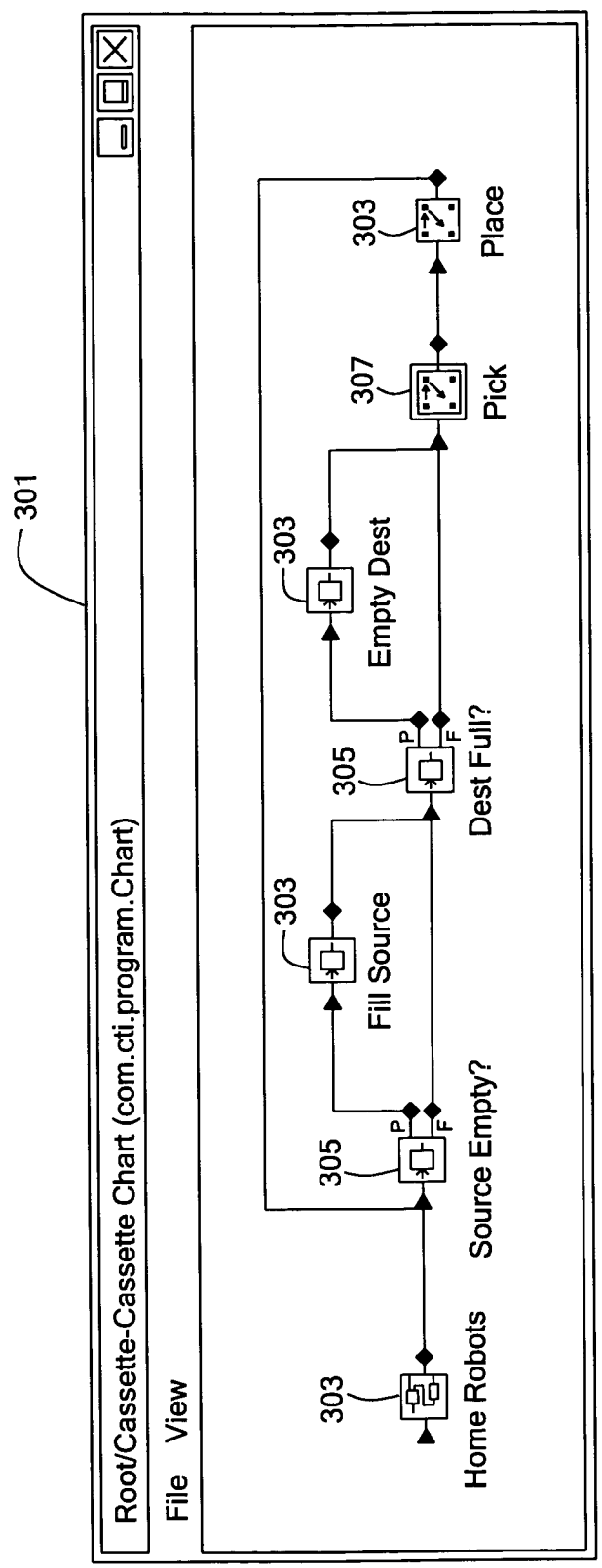
FIG. 3 is a user-defined graphical program flowchart for defining a process program.

The inventive client software provides a graphical programming environment that allows developers to create robotic control programs by dragging, dropping and connecting program steps or "objects". This graphical programming environment can take the form of a flowchart or the ladder-logic form familiar to manufacturing technicians. Referring to FIG. 3, a graphical program 301 is shown with different program objects graphically displayed as blocks 303, 305, and 307 which are connected together to form a sequence of program steps. A program block can be edited by double-clicking on it with the mouse, which brings up a dialog describing its properties. Depending on the results of the block's execution, multiple execution paths can be followed out of the block 305. Flowcharts are themselves program objects and can be nested within other flowcharts. The programmer can interactively set a breakpoint on any block or specify that a block should execute in parallel with the rest of the chart rather than sequentially. The block 307 currently being executing is graphically highlighted, in this example by modifying the block border. While debugging the control program, users can single-step through execution of the blocks.

The GUI allow various types of information to be displayed on the clients including: device status and control displays, device parameter editing displays, machine vision image viewing, 3-D simulation, graphical program editing, live status flowchart, live I/O updates, ladder-logic programming editing, robot status and control panels, vision processing result displays, and live vision image inspection displays. The device status and control GUI displays text messages indicating the status of the devices and controls that are part of the control system and allows authorized clients to control the devices. The device parameter editing GUI displays the device parameters and allows clients to edit the device parameters. The GUI allows clients to view 3-D illustrations of the system devices from any virtual distance, rotation, and virtual point of view. The 3-D display is dynamically updated to show the current position of robots and other moving devices in the workcell. It is also used to highlight devices that are in an error state using alternative coloring, flashing, or other graphical highlighting techniques. The graphical program editing GUI allows clients to view, edit and develop control program flowcharts. The flowchart GUI allows clients to view live updates of the current execution state of the control program. The live I/O updates GUI allows clients to view live updates of the current input and output devices. The ladder-logic programming editing GUI allows clients to edit the logical dependency of objects in the control system. The robot status and control panels GUI are similar to a virtual teach pendant and allow clients to manually control the robot motions. The live vision image inspection GUI displays the current output of the inspection imaging hardware, with a graphical overlay that shows inspection results and areas of interest in the image.

Figure 4:
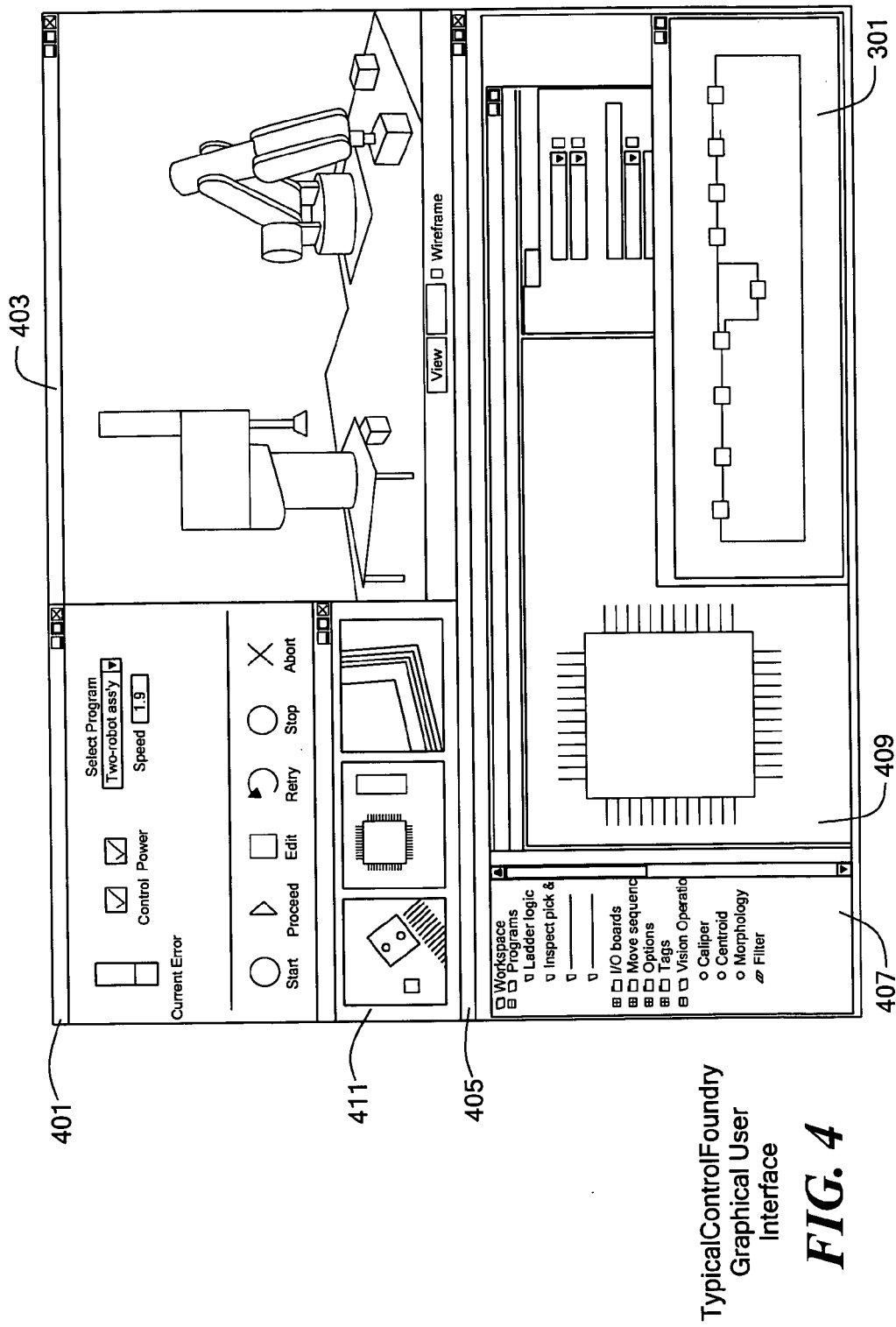
FIG. 4 is a graphical user interface for a workcell with two robots, multiple cameras, vision inspection, a workcell object tree, and a graphical user program.

Client computers can be configured by users to display any combination of default GUIs. Users can also create their own GUIs. Referring to FIG. 4, a typical combination of GUIs for the inventive system is illustrated. A user-configurable status and control panel 401 allows for program selection, program control, and program monitoring. The 3-D simulation and diagnostics window 401 shows either the current real-world position and status of the robots (if operating in control mode and hardware is connected) or simulated commanded positions of the robots (if operating in simulation mode). The 3-D display GUI, allows the simulated device to be viewed from any angle, rotation or magnification, allowing collisions of the devices or other errors in the operating program to be detected. As a result, the combined client/server system may be fully tested offline in pure simulation mode before being connected to the actual system hardware. The object editor window 405 shows the system object tree 407, the current vision image 409 being received by the image hardware, and a graphical program 301 being executed by the system. A vision display window 411 displays vision inspection results in thumbnail format. The inventive client software can also display merged 3-D simulations and information related to all networked servers. The single merged GUI client display 403 can therefore provide an accurate live graphical simulation of an entire factory containing many robots and servers.

Figure 5:
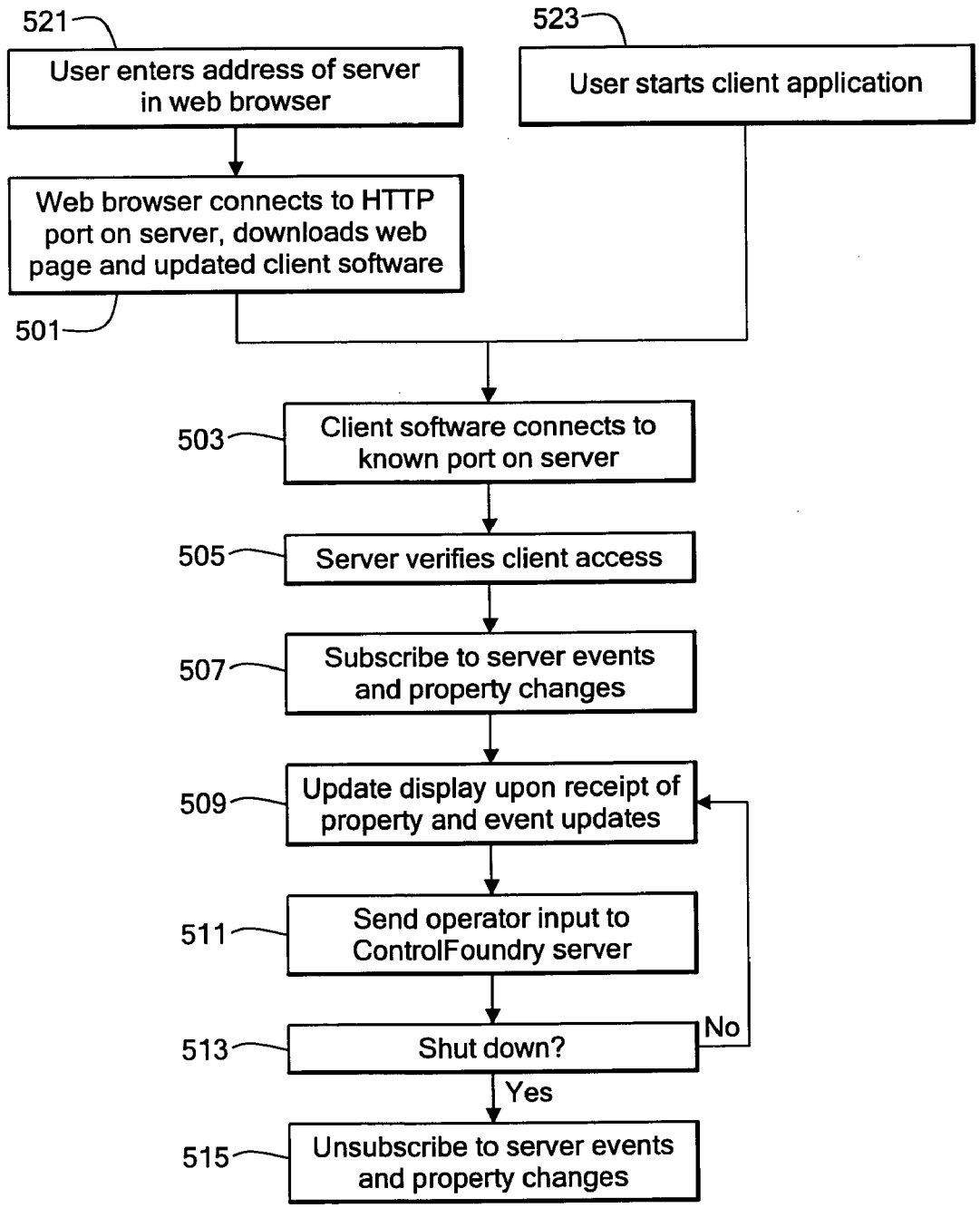
FIG. 5 is a client flow diagram for building a status and control client.

Referring to FIG. 5, a flow chart of the procedures used to initiate and sustain communication between the server and clients over a network during a typical session is illustrated. The client first connects to the server using either an applet within a web browser 521 or an application 523. The advantage of using a web browser is that the client need install no software on their system other than the web browser: HTML tags in the web page obtained from the server specify the libraries required by the client to ensure that up-to-date versions of the client software are downloaded 501 from the server. When using a client application 523, some or all of the required software libraries must be present on the client in order for it to start execution. In either case, the client applet or application connects to the server in the standard manner of opening a socket connection 503 with a known port on the server. Once the server verifies access is allowed based on client password, IP address, or other means 505, the server allows remote procedure calls to be performed that allow client access appropriate to that client's privileges. The client then subscribes 507 to events and property changes of interest on the server.

To ensure security from unauthorized access and use, the server software is configured such that only properly authorized personnel are allowed access to the server computer. The server may allow different levels of access for clients such that some clients can access status data as well as data editing and control, while other clients may only access status data and are not allowed into the editing and control areas of the server. Clients having high access privileges can control all server functions and may have the ability to remotely control the server computers and operate devices connected to the server. Clients having lower privileges may develop robot control programs and run 3-D simulations of the control programs using object oriented programming. Other clients having an even lower access privileges may only obtain operational status information from the servers. The server security system also prevents multiple users from simultaneously accessing critical control areas of the server software. A single-point-of-control policy allows only one client to issue commands to a server at a time. To transfer control from one client to another, the controlling client must yield control to the server, and the requesting client requests control. The server may refuse to transfer control to a requesting client if its access privileges are insufficient.

The server software has an execution engine that runs user-specified programs and handles exception reporting to networked computers. Exceptions occur whenever the control and simulation program execution pauses for outside intervention of any type. An unexpected exception may be reported to networked computers when unexpected system errors occur, such as a motor overheating or a timeout waiting for sensor to report a desired value. An expected exception may be reported due to intentional pauses in the system operation, such as a pause for operator intervention between steps when operating in single-step mode.

Referring again to FIG. 5, when an exception occurs on the server, subscribers to exception events are each sent a message 509 containing an exception object. The exception object will contain the identification of the source of the exception, an error message, and possibly additional descriptive information such as error codes or program stack traces. The exception is displayed on the client and viewed by the operator in some appropriate way, usually as text describing the exception. Additional information such as the execution stack trace at the time of the exception may also be displayed. The exception object also contains information indicating whether the possible recovery selections for the exception, such as whether the operator will be allowed to proceed, retry, and/or abort execution. The operator's recovery selection 511 is sent to the server, which will typically result in another state change as the program resumes or halts execution. When the operator chooses to shut down 513, the operator unsubscribes 515 from the events previously subscribed to in step 507 prior to stopping and disconnecting the client from the server.

A client showing a 3-D display of the workcell can use the exceptions reported by the server to highlight problematic objects in the workcell. When an exception is reported, the client checks to see if the source of the error is an object capable of graphical display. If so, the client highlights the simulated erroneous object in some way. In the preferred embodiment, the object is highlighted on the simulation display by alternately changing the object color to red and then restoring the object to its default coloring with a one-second period. This flashing cycle continues until the exception is cleared, at which point the object is no longer highlighted and is returned to its initial state (visible or invisible).

A useful aspect of the 3-D simulation mode is collision detection. When a control program is being written, the 3-D rendering software can perform automatic collision detection between objects. This feature warns developers of potential collisions that will occur before control software is used with the actual hardware devices during development and simulation of new robotic workcells. Colliding objects can be highlighted in the same manner that is used to highlight exceptions, as discussed above.

The diagnostic highlighting feature can also be used in conjunction with teaching the robot locations. During operating program development, when the operating system is in teaching mode, the robot pauses before each move and the server publishes an exception with the move location itself as the exceptions source. The 3-D display then highlights the current location of the move in the 3-D display as a set of three arrows representing the X, Y and Z coordinates system. As a result, the 3-D display, operators can "see" trajectory locations that are physically invisible before the robot moves to those locations. The ability to see locations in a 3-D display is useful during development using the simulation and during actual operation while teaching and debugging the system.

Figure 6:
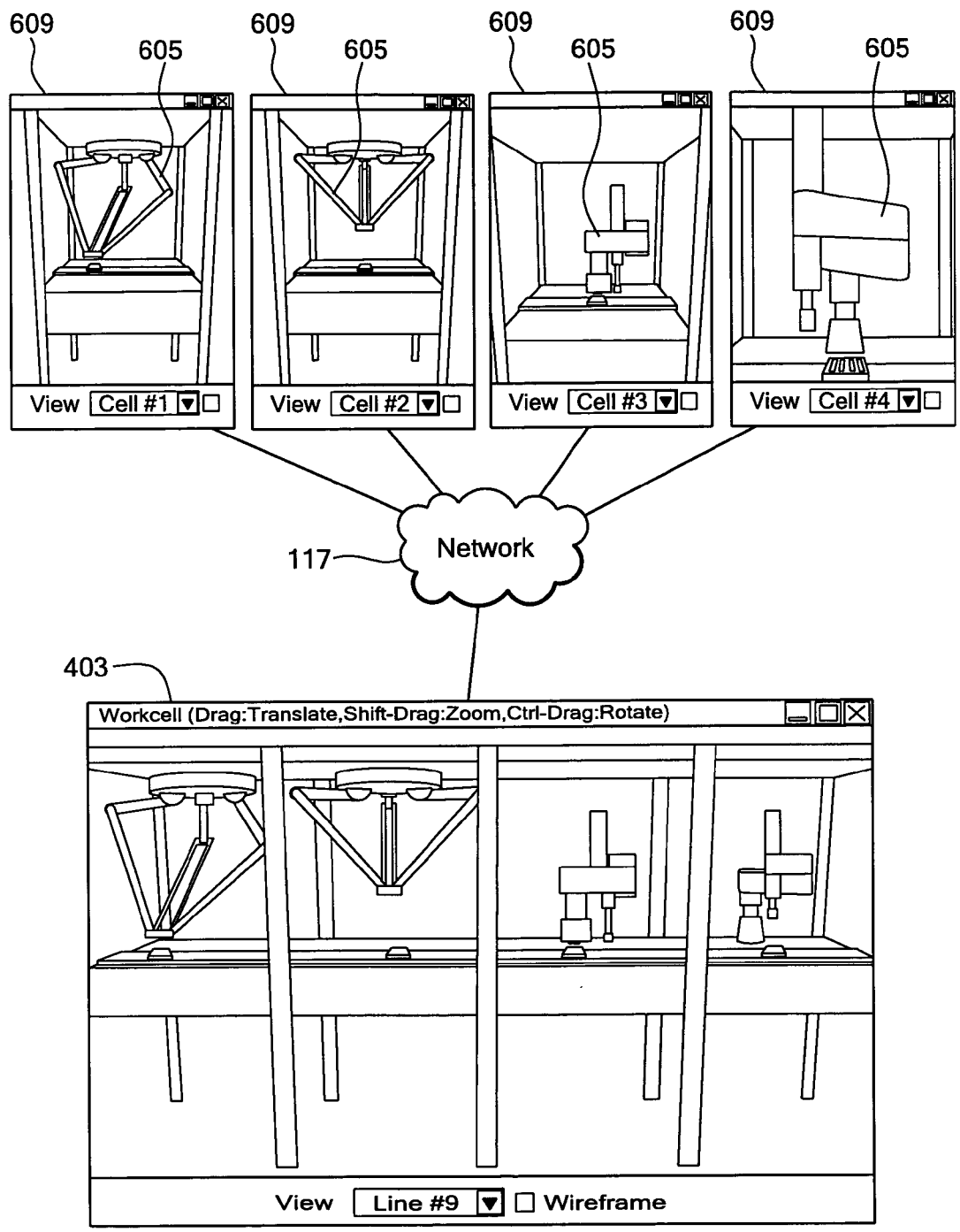
FIG. 6 is a merged network display of multiple simulation and diagnostic windows into one simulation and diagnostic window.

As discussed, the inventive client software can also display merged 3-D simulations and information related to all networked servers onto a single client display. Referring to FIG. 6, the merged 3-D simulation and diagnostic display includes four robots 605 each controlled by individual servers 609 merged into a single 3-D simulation and diagnostic display 403. The client initiates communication with the desired servers 609 through the network 117. It can then merge the status displays of each server 609 into a single display. For example, to create the merged 3-D simulation display, the client requests a list of all objects that can be simulated from each server. The client then subscribes to the events related to the 3-D simulation for each server, including dimensional and positional changes to the objects and server errors that should be highlighted in the diagnostic display. By subscribing to the 3-D events of all servers, the client can show a "virtual factory view" that will accurately display all devices controlled by the networked servers. The relative locations of the devices controlled by the servers will also be accurately displayed when all workcells use a common origin location.

Figure 7:
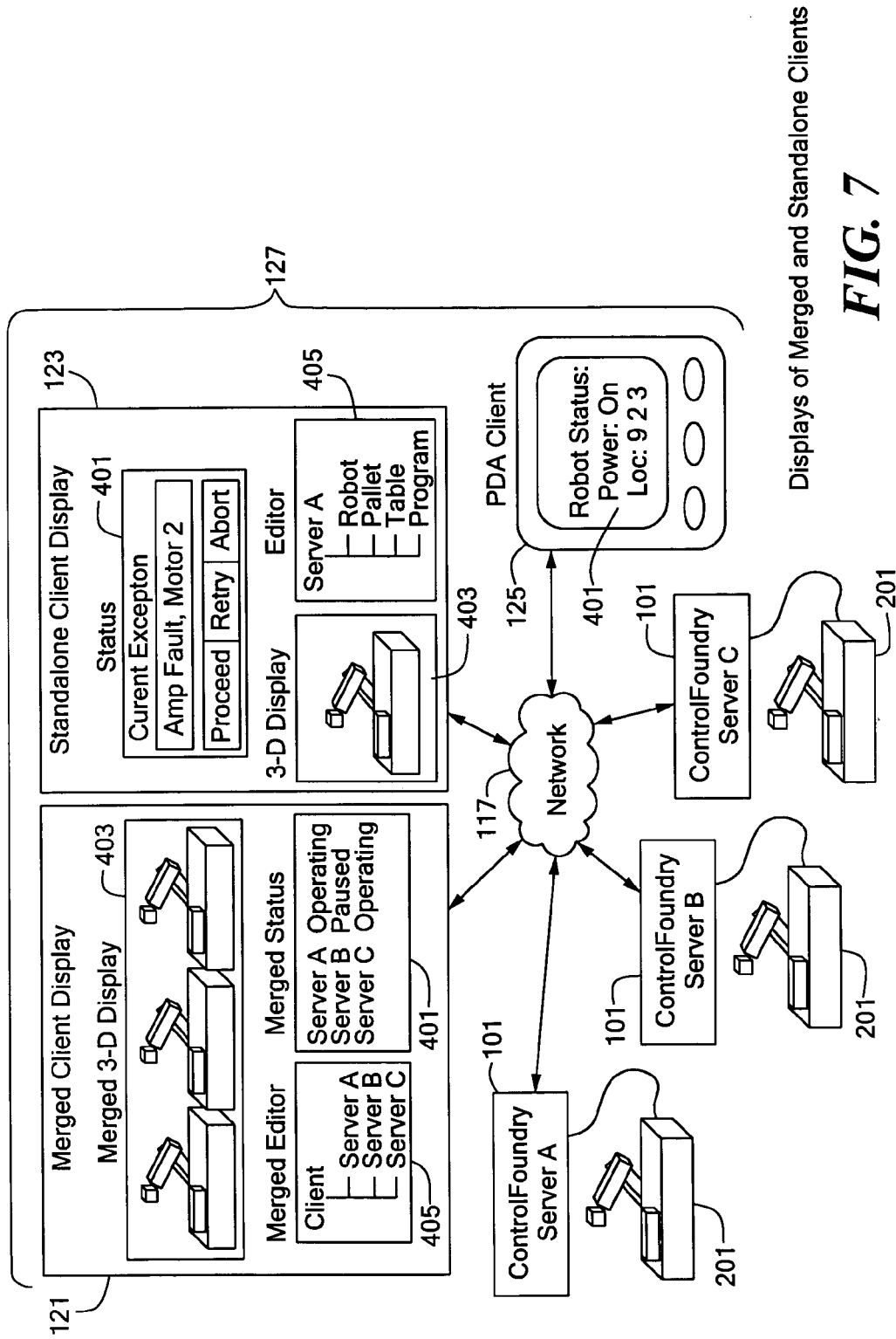
FIG. 7 is a graphical depiction of a scenario with several servers and clients.

Referring to FIG. 7, an exemplary system of servers 101 and clients 127 connected to a network 117 is illustrated. Each server 101 controls a workcells 201. Two standalone clients 121, 123, the PTA 125 and the personal computer 123, are each connected to one of the servers 101 through the network 117. A merged client 121 is connected to all three servers 101 through the network 117. Note that each client 127 may have different status displays 401, 3-D simulation and diagnostic displays 403, and editing displays 405. Because the merged client 121 is connected to three servers 101, the diagnostic displays 403 can simultaneously display simulation of all three workcells 201.

Figure 8:
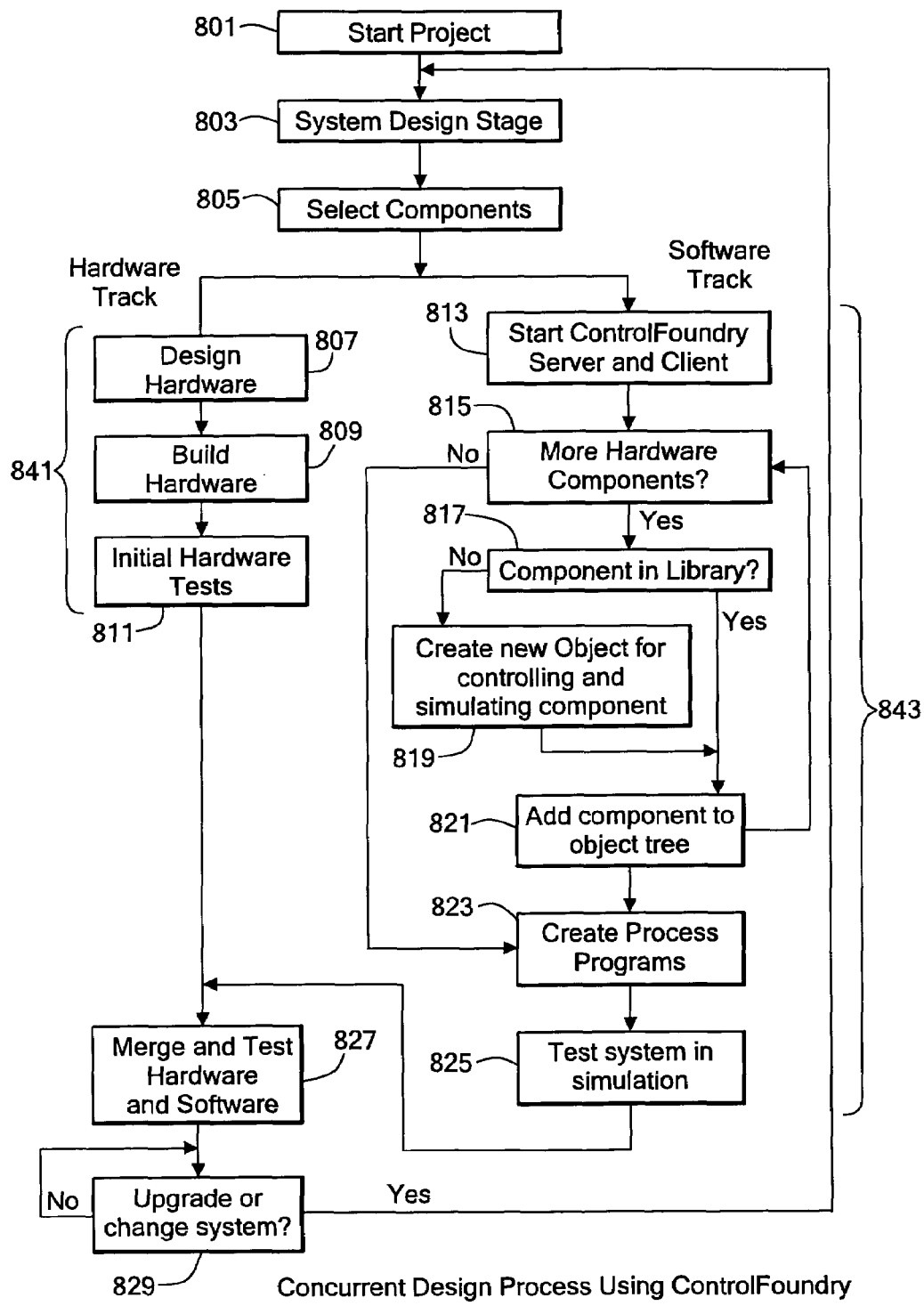
FIG. 8 is a block diagram of a parallel development process made possible by the invention.

As discussed, the inventive control and simulation development software provides integrated simulation which allows the application hardware and software to be developed in parallel, reducing the time required to install a robotic system in a specific application. Referring to FIG. 8, a concurrent system development process flow chart is illustrated. The project is started 801, the general control system is designed 803, and the components of the system are selected 805. The development process then splits into parallel tracks that can be performed concurrently and independently. The hardware development track 841 includes the tasks: design hardware 807, build hardware 809, and test hardware 811.

The software development track 843, however, begins by simulating hardware devices, and gradually integrating the application hardware as it becomes available. The required hardware typically includes: robots, sensors, conveyors, cameras, and other devices. After starting the server and client software design track 813, simulated hardware components are added into the system 815. If the desired component is in the library 817 of components known to the server, the component can be immediately added to an object tree 821 which stores the required components. If the desired component is not in the library, a new software component must be created that simulates and controls the desired component 819. After all required components are in the object tree, the application process programs are then created 823, preferably in the described graphical flowchart programming environment. The server software can then be run in simulation mode 825, to test and debug of the application process program and component logic. All testing can be done independent of the hardware development. As the hardware becomes available, hardware and software can be merged and tested 827, the system can operate in a mixed mode that actual controls available hardware and simulates control of unavailable hardware. If the system is upgraded or changed 829 after the system becomes fully operational, any existing or proposed components or process program changes can be tested offline by disabling the actual control mode and using the simulation mode to test the modifications.

Figure 9:
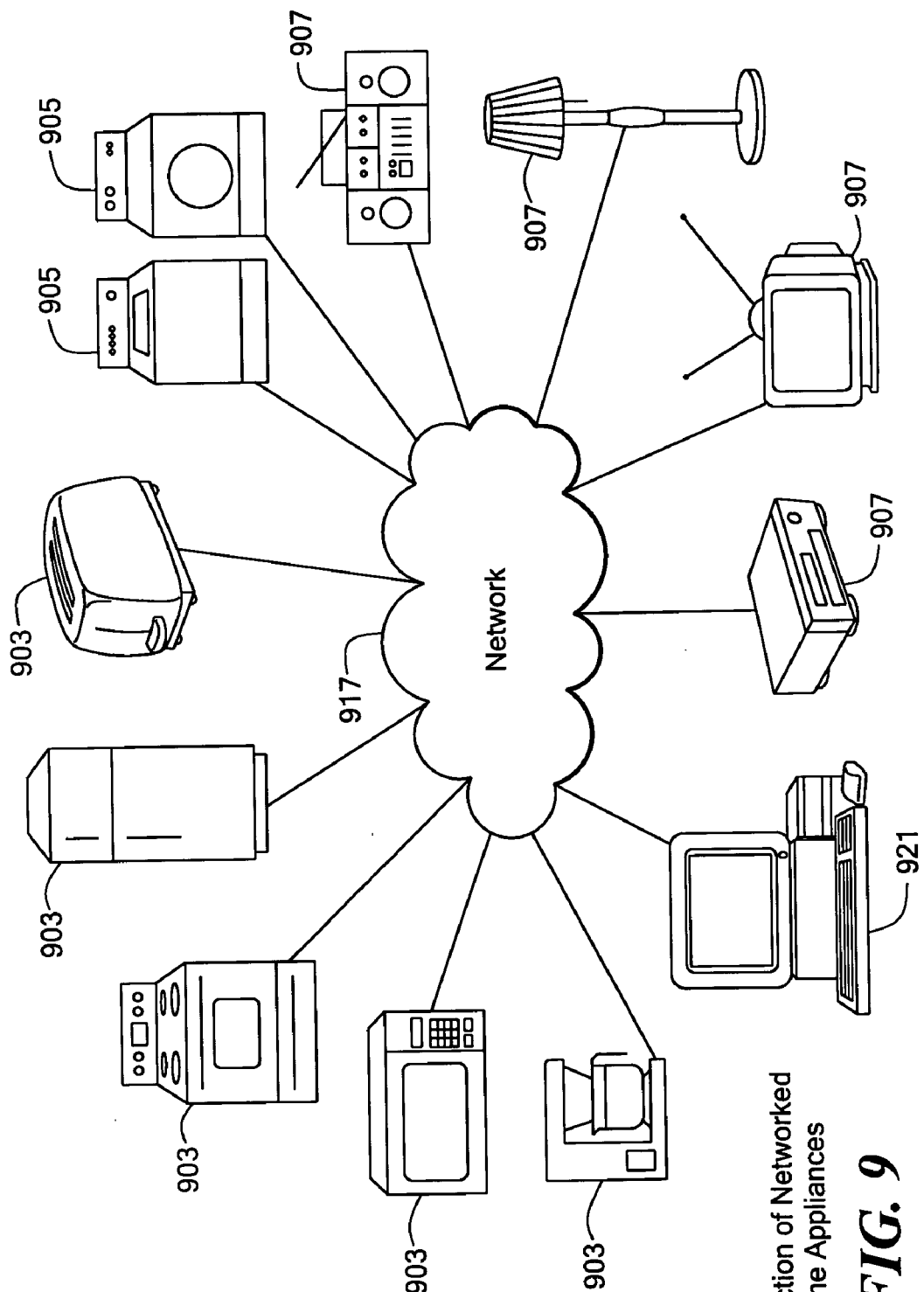
FIG. 9 is an embodiment of the invention used with a collection of networked home appliances.

In an alternative embodiment, the inventive control and simulation system can be used to visually control and monitor a variety of household devices through a web browser. FIG. 9 illustrates various networked devices that may be controlled and simulated using the inventive system, such as home appliances, including kitchen appliances 903, laundry room appliances 905, consumer electronic equipment 907, and personal computers 921 all connected to a network 917. The kitchen appliances 903 may include: coffee makers, microwave ovens, conventional ovens, refrigerators and toasters. Laundry room appliances 905 may include: washers and dryers. Consumer electronic equipment 907 can include: televisions, stereo systems, VCRs and lights. The network 917 may include any described embodiments as well as the household electrical system. At least one of the computers 921 connected to the network is the server which functions as previously described. Each networked device can be controlled and simulated by the inventive control and simulation system.

Referring to FIG. 10, the inventive simulation system can be used to display all networked devices on a merged diagnostic window 403 of computer connected to the network. The merged 3-D simulation display can include all device, including the kitchen appliances 901 and 903, the living room devices 907, and the laundry room devices 905. A user could select the graphic image of the coffee maker 901 to view the coffee maker's current program, status, control panel and editing panel (transferred from the coffee maker's control program to the web browser over the network). Furthermore, any error conditions in the coffee maker can be visually highlighted in the merged diagnostic window 403 for user notification.

The described programming language and messaging protocol used in the illustrative embodiments are not material to the invention. Any other suitable language may be used instead of Java, including but not limited to C, C++, and Visual Basic. Similarly, instead of Java's Remote Method Invocation protocol, the Common Object Request Broker Architecture (CORBA) protocol, the Distributed Common Object Model (DCOM) protocol, or other standard or custom messaging protocol may be used. The messages may be passed as XML, SECS II, or as other standard or custom packet structures.

In the foregoing, a system for control and simulation has been described. Although the present invention has been described in considerable detail with reference to specific exemplary embodiments, it will be evident that various modifications and changes may be made to these embodiments without departing from the broader spirit and scope of the invention as set forth in the claims. For example, a person of ordinary skill in the art could apply this invention to alternative embodiments, including the control and simulation of power stations, water plants, highway traffic control and monitoring systems, medical devices, HVAC systems, and home automation systems. Accordingly, the specification and drawings, which describe robotic and machine control embodiments are to be regarded in an illustrative rather than a restrictive sense.

What is claimed is:

1. A method of controlling a robotic device, comprising:
inputting a set of instructions for controlling the robotic device;
controlling a first portion of the robotic device according to the instructions;
simulating a second portion of the robotic device according to the instructions, wherein the second portion of the robotic device is disabled or absent; and
displaying an animated image of the robotic device that includes both the first and second portions of the robotic device in a single image, the image depicting the first portion of the robotic device being controlled according to the instructions and the second portion of the robotic device being simulated according to the instructions.

2. The method of claim 1, wherein:
the controlling the first portion of the robotic device comprises using a server computer to control the robotic device; and
the displaying the animated image of the robotic device comprises using a client computer to display the image; and further comprising:
interconnecting the server computer and the client computer via a network.

3. The method of claim 1, further comprising:
controlling a first portion of each of a plurality of robotic devices according to the instructions;
simulating a second portion of each of the plurality of robotic devices according to the instructions, wherein the respective second portion of the robotic device is disabled or absent; and
displaying a plurality of animated images, each animated images depicting at least one of the robotic devices, each image including both the first and second portions of the at least one robotic device in a single image, each image depicting the first portion of the respective robotic device being controlled according to the instructions and the second portion of the respective robotic device being simulated according to the instructions.

4. The method of claim 1, further comprising:
detecting an error; and
highlighting a portion of the animated image related to the error.

5. The method of claim 1, further comprising:
obtaining a video image of at least a portion of a work cell that contains the robotic device; and
displaying the video image in conjunction with displaying the animated image.

6. The method of claim 1, further comprising:
pausing execution of the instructions; and
displaying a position of the robotic device that includes both the first and second portions of the robotic device in a single image, the image depicting the first and second portions of the robotic device as of the most recent instruction executed.

7. The method of claim 6, wherein the pausing execution of the instructions is in response to a user command.

8. The method of claim 6, wherein the pausing execution of the instructions is in response to a pause instruction in the set of instructions.

9. The method of claim 6, wherein the pausing execution of the instructions is in response to reaching an end of the set of instructions.

10. The method of claim 6, further comprising:
in response to a user command, continuing execution of the instructions.

11. The method of claim 6, further comprising:
inputting at least one additional instruction for controlling the robotic device.

12. The method of claim 11, further comprising:
displaying a position of the robotic device that includes both the first and second portions of the robotic device in a single image, the image depicting the first and second portions of the robotic device as if the at least one additional instruction were executed.

13. The method of claim 12, further comprising:
in response to a user command, executing at least one of the at least one additional instruction.

14. The method of claim 6, further comprising:
in response to a user command, editing at least one of the instructions.

15. The method of claim 14, further comprising:
displaying a position of the robotic device that includes both the first and second portions of the robotic device in a single image, the image depicting the first and second portions of the robotic device as if the at least one edited instruction were executed.

16. The method of claim 15, further comprising:
in response to a user command, executing the at least one edited instruction.

17. A system for controlling a robotic device, comprising:
a computer system connected to the robotic device to control operation of the robotic device;
a memory connected to the computer system;
a display device connected to the computer system; and
a program stored in the memory to control operation of the computer system and the display device, the program being configured to:
input a set of instructions for controlling the robotic device;
control a first portion of the robotic device according to the instructions;
simulate a second portion of the robotic device according to the instructions, wherein the second portion of the robotic device is disabled or absent; and
display an animated image of the robotic device on the display device, the animated image including both the first and second portions of the robotic device in a single image, the image depicting the first portion of the robotic device being controlled according to the instructions and the second portion of the robotic device being simulated according to the instructions.

18. The system of claim 17, wherein:
the computer system comprises a server computer and a client computer and further comprising a network interconnecting the server computer and the client computer; wherein:
the server computer is connected to the robotic device to control operation of the robotic device; and
the display device is connected to the client computer.

19. The system of claim 17, wherein the computer system is connected to a plurality of robotic devices to control operation of the plurality of robotic devices and the program is further configured to:
control a first portion of each of the plurality of robotic devices according to the instructions;
simulate a second portion of each of the plurality of robotic devices according to the instructions, wherein the respective second portion of the robotic device is disabled or absent; and
display a plurality of animated images, each animated images depicting at least one of the robotic devices, each image including both the first and second portions of the at least one robotic device in a single image, each image depicting the first portion of the respective robotic device being controlled according to the instructions and the second portion of the respective robotic device being simulated according to the instructions.

20. The system of claim 17, wherein the program is further configured to:
detect an error; and
highlight a portion of the animated image related to the error.

21. The system of claim 17, further comprising:
a video image capture device connected to the computer system and oriented toward a portion of a work cell that contains the robotic device; and
wherein the program is further configured to display a video image from the video image capture device in conjunction with displaying the animated image.

22. The system of claim 17, wherein the program is further configured to:
pause execution of the instructions; and
display a position of the robotic device that includes both the first and second portions of the robotic device in a single image, the image depicting the first and second portions of the robotic device as of the most recent instruction executed.

23. The system of claim 22, wherein the program is further configured to:
input at least one additional instruction for controlling the robotic device; and
display a position of the robotic device that includes both the first and second portions of the robotic device in a single image, the image depicting the first and second portions of the robotic device as if the at least one additional instruction were executed.

24. The system of claim 22, wherein the program is further configured to:
in response to a user command, edit at least one of the instructions; and
display a position of the robotic device that includes both the first and second portions of the robotic device in a single image, the image depicting the first and second portions of the robotic device as if the at least one edited instruction were executed.

* * * * *